Feb. 8, 1927.
J. B. WATSON
1,616,478
GUARD FOR CIRCULAR SAWS
Filed Jan. 19, 1926 2 Sheets-Sheet 1
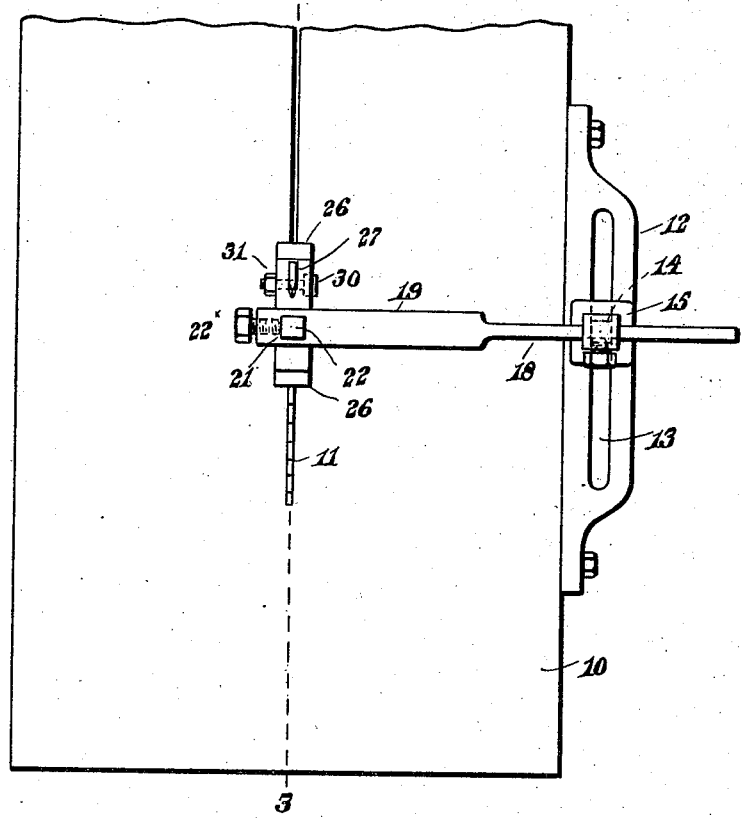
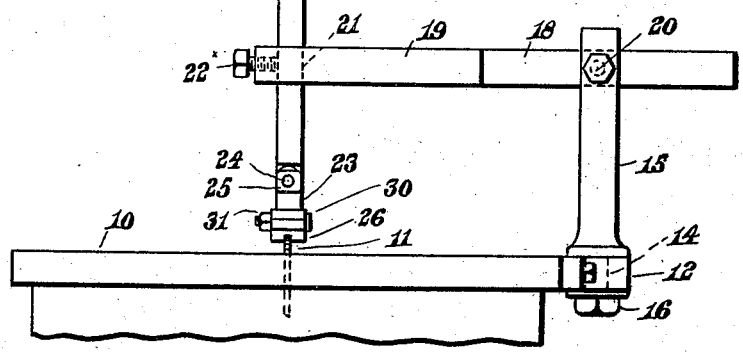
Inventor:
James B. Watson,
by Walter E. Lombard, Atty.

Feb. 8, 1927.

J. B. WATSON

GUARD FOR CIRCULAR SAWS

Filed Jan. 19, 1926    2 Sheets-Sheet 2

Inventor:
James B. Watson,
by Walter E. Lombard.
Atty.

Patented Feb. 8, 1927.

1,616,478

UNITED STATES PATENT OFFICE.

JAMES B. WATSON, OF MATTAPAN, MASSACHUSETTS, ASSIGNOR OF ONE-THIRD TO JULIUS C. REICHE, OF ARLINGTON, MASSACHUSETTS, AND ONE-THIRD TO CLARENCE E. CATES, OF BRIGHTON, MASSACHUSETTS.

GUARD FOR CIRCULAR SAWS.

Application filed January 19, 1926. Serial No. 82,288.

This invention relates to guards for circular saws and has for its object the provision of means for preventing the sawed portion of the work from springing upward as it passes from the saw and also from binding upon the side faces of the saw.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents a plan of a circular saw table with a saw guard thereon embodying the principles of the present invention.

Figure 2 represents a front elevation of the same.

Similar characters indicate like parts throughout the several figures of the drawings.

Figure 3:
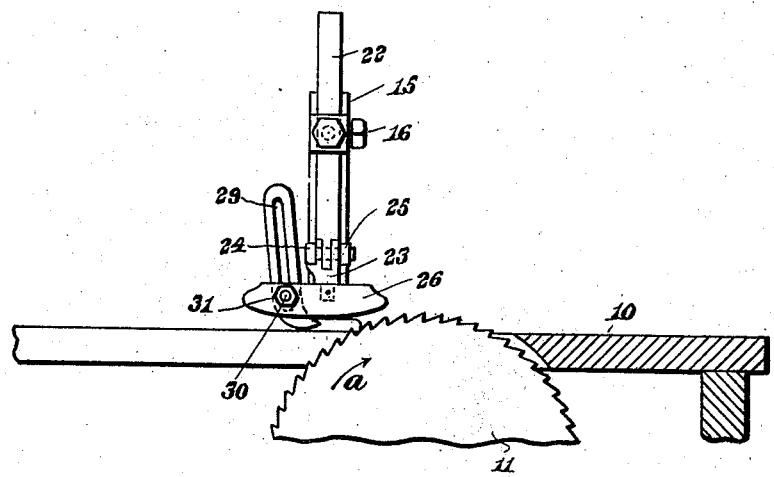
Figure 3 represents a vertical section of the same.
Figure 4:
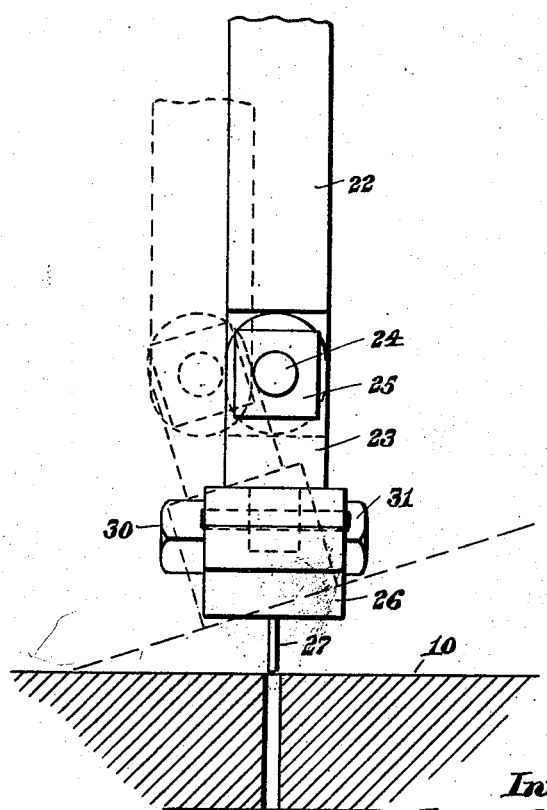
Figure 4 represents a front elevation of the saw guards and support therefor.

In the drawings, 10 is a saw table of usual construction having mounted therein in any well known manner a circular saw 11 which rotates towards the front of the table 10 in the direction of arrow *a* on Fig. 3.

As the means of operating the saw and the supports for the saw table form no part of the present invention it is believed that no illustration of these devices is necessary.

To one side of the table 10 is secured a bracket 12 having a slot 13 therein parallel with the sides of the saw 11.

Extending through the slot 13 is the reduced end 14 of a vertical post 15 extending upwardly above said bracket 12.

The reduced end 14 has flat sides contacting with the walls of the slot 13 thereby preventing any rotation of said post 15.

A clamping nut 16 threaded to the extreme lower end of the post 15 is adapted to clamp the post 15 in its adjusted position, the slot 13 providing a means whereby the post 15 may be moved in a plane parallel to that of the sides of the saw 11.

The upper end of the post 15 has a rectangular slot 17 extending therethrough in which is positioned the flat sided portion 18 of a horizontal support 19.

The portion 18 may be adjusted in the slot 17 and secured in adjusted position by means of the set screw 20.

This horizontal support has a rectangular slot 21 extending therethrough in which is mounted the flat sided upper end of a depending member 22 having a lower end 23 pivoted thereto by means of a bolt 24 and clamp nut 25 thereby making it possible to move the end 23 at an angle to the body portion of the depending member 22 when certain kinds of work are being cut by the saw 11.

When the end 23 is thus adjusted it is clamped in position by the nut 25.

To the lower end of the end portion 23 is secured a block 26, the sides of which extend beyond the opposite faces of the saw 11. The depending member 22 is held in adjusted position by set screw 22ˣ.

The block 26 is adjusted so that its lower surface is closely adjacent the upper face of the work being operated upon thereby preventing the sawed portion of the work springing upwardly away from the table 10.

In the block 26 is disposed a wedge-shaped finger 27 which extends downwardly towards the table 10.

As the work is fed from the saw 11 the finger 27 will enter the saw cut in the work and prevent the portions on opposite sides of the cut from impinging upon the sides of the saw.

The finger 27 is provided with a vertical slot 29 through which extends a clamping bolt 30 having a clamp nut 31 threaded to one end.

By means of this clamping device 30, 31 the finger 27 may be adjusted vertically and secured in adjusted position.

This provides means whereby when the blocks 26 are raised to accommodate thicker work, the finger 27 may be lowered so that its lower end will always be just above the top of the table.

The slot 13 is provided so that the post 15 may be adjusted therein to accommodate the position of the block 26 to saws 11 of different diameters.

The adjustment of the horizontal support 19 relatively to the post 15 is to center the blocks with the saw 11 for different widths of tables.

The guard block 26 bearing upon the sawed portions of the work retains it firm and steady, thus eliminating the possibility of the work jumping back.

This construction of guard for circular saws is very effective in operation as it prevents the sawed portion of the work from springing away from the table and owing to its being located behind the saw it does not prevent the workman from having a clear view of the work which he is operating upon.

The saw guards now in use are positioned above the saw or so far to the front of the table that the workman does not have a clear view of the work and as a consequence there is great liability of the workman being injured.

By placing the guard behind the saw this objection is obviated.

The supports for the guard are so adjustable that the guard may be placed in any desired position to accommodate it to various shapes of work it is desired to operate upon.

It is believed that the operation and many advantages of the invention will be understood without further description.

Having thus described my invention, I claim—

1. In a saw guard, a horizontal support above the saw table and at the rear of the saw; a member depending therefrom; and a guard block on the lower end of said depending member behind the crest of said saw, under which the work passes and by which it is prevented from rising and extending laterally.

2. In a saw guard, a horizontal support above the saw table and at the rear of the saw; a member depending therefrom; a guard block on the lower end of said depending member behind the crest of said saw, under which the work passes and by which it is prevented from rising and extending laterally; and a downwardly extending finger secured in said guard block and normally in the same vertical plane as said saw.

3. In a saw guard, a horizontal support above the saw table and at the rear of the saw; a member depending therefrom; a guard block on the lower end of said depending member behind the crest of said saw under which the work passes and by which it is prevented from rising and extending laterally; and a downwardly extending wedge-shaped finger secured in said guard block and normally in the same vertical plane as said saw.

4. In a saw guard, a horizontal support above the saw table and at the rear of the saw; a member depending therefrom; a guard block on the lower end of said depending member behind the crest of said saw under which the work passes and by which it is prevented from rising and extending laterally; and means for adjusting said block vertically, to accommodate said block for various thicknesses of work.

5. In a saw guard, a horizontal support above the saw table and at the rear of the saw; a member depending therefrom; a guard block on the lower end of said depending member behind the crest of said saw under which the work passes and by which it is prevented from rising and extending laterally; and means for adjusting said block horizontally towards and from the rear of said saw.

6. In a saw guard, a horizontal support above the saw table and at the rear of the saw; a member depending therefrom; a guard block on the lower end of said depending member behind the crest of said saw under which the work passes and by which it is prevented from rising and extending laterally; a slotted bracket secured to said table and parallel to a side face of the saw; and a vertical post adjustably secured thereto and having provision for securing thereto said horizontal support.

7. In a saw guard, a broad faced guard block in the rear of the crest of the saw under which the work passes and by which it is prevented from rising and extending laterally; means for adjusting said block vertically to accommodate it to various thicknesses of work; and other means for adjusting the position of said block horizontally toward and from the rear edge of the saw.

Signed by me at 746 Old South Bldg., Boston, Mass., this 8th day of January, 1926.

JAMES B. WATSON.